B. SCHECHTER.
CAR SEAT.
APPLICATION FILED APR. 23, 1919.

1,355,005.

Patented Oct. 5, 1920.
2 SHEETS—SHEET 1.

Inventor,
Bernard Schechter
By his Attorneys,
Howson & Howson

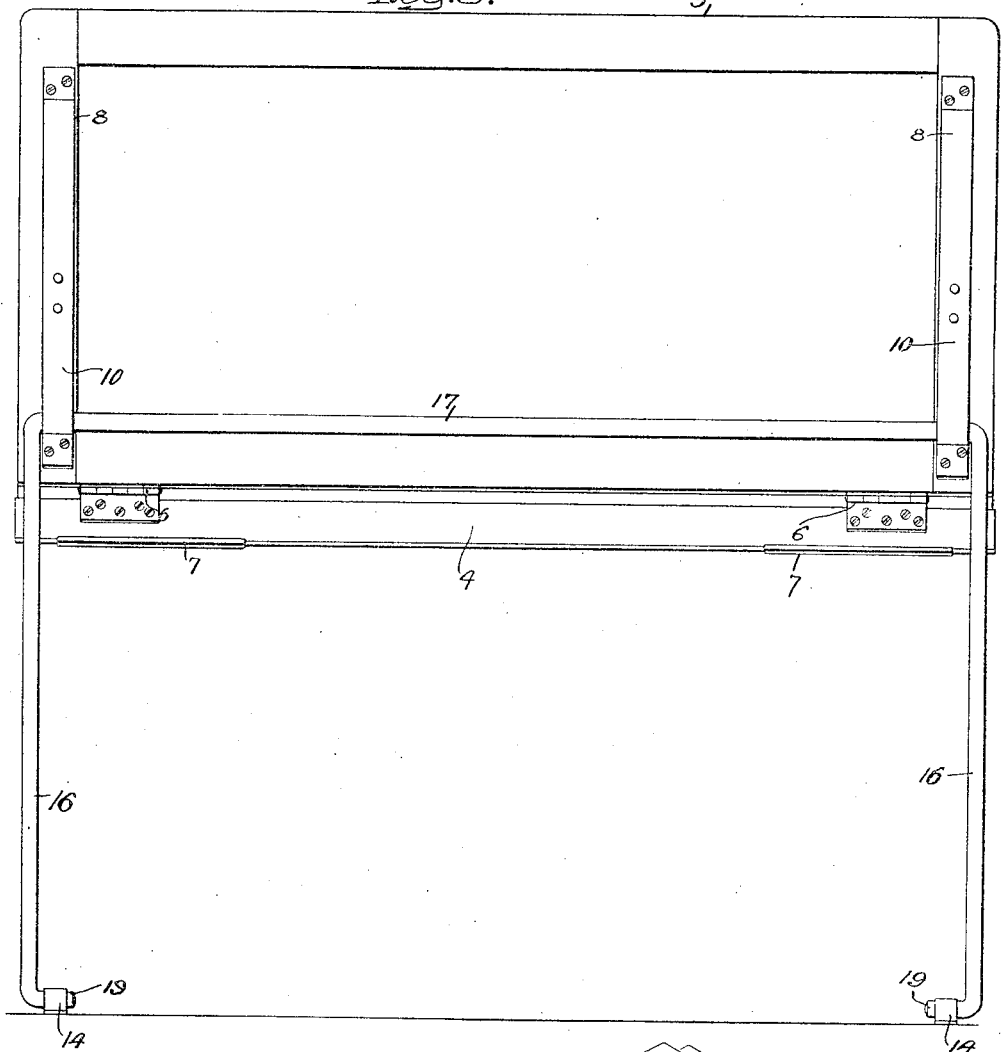
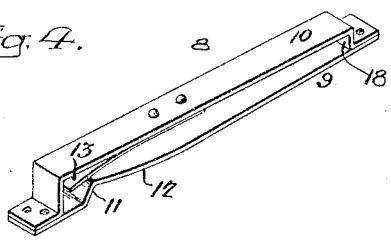

UNITED STATES PATENT OFFICE.

BERNARD SCHECHTER, OF ST. LOUIS, MISSOURI, ASSIGNOR TO AMERICAN CAR COMPANY, OF ST. LOUIS, MISSOURI, A CORPORATION OF MISSOURI.

CAR-SEAT.

1,355,005.        Specification of Letters Patent.        Patented Oct. 5, 1920.

Application filed April 23, 1919. Serial No. 292,044.

*To all whom it may concern:*

Be it known that I, BERNARD SCHECHTER, a citizen of the United States, and a resident of the city of St. Louis, State of Missouri, have invented certain Improvements in Car-Seats, of which the following is a specification.

The object of my invention is to improve the construction of pivoted seats for passenger cars and to provide means whereby a single brace will hold the seat in its upright position, or in a horizontal position.

In the accompanying drawings:

Fig. 3 is a face view looking in the direction of the arrow, Fig. 1, and

Fig. 4 is a perspective view of the spring guides for the brace.

Figure 1:
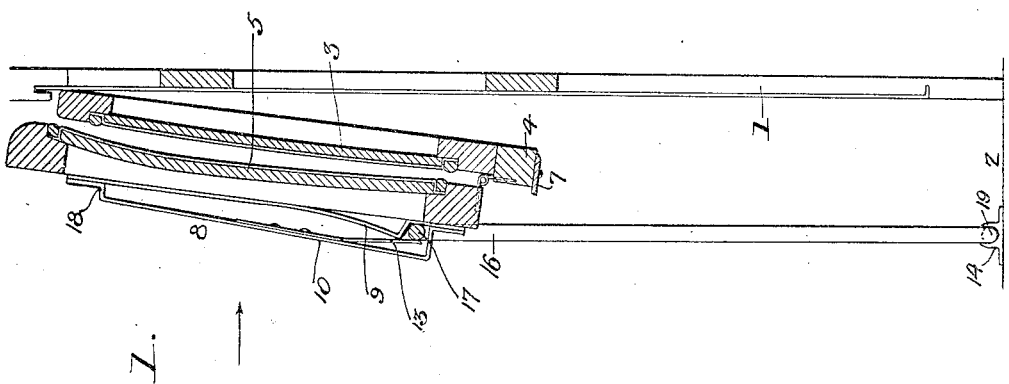
Figure 1 is a sectional view of my improved car seat, showing the seat section in an upright position.

Referring to the drawings, 1 is the frame of the car body. 2 is the floor, or platform. 3 is the fixed back structure of the car seat and 4 is the bottom rail to which the seat section 5 is hinged. In the present instance, I have shown two hinges 6. 7 are two plates, which extend beyond the edge of the bottom rail so as to take the strain off of the hinges when the seat section is in the horizontal position. Secured to the under surface of the seat section 5 are guides 8, shaped as shown in Fig. 4. These guides consist of two metallic plates 9 and 10 bent, as shown. The bottom plate 9 is bent to form a stop 11 and is curved at 12 beyond the stop, while the plate 10 is bent to form a keeper, which extends over the portion of the plate 9 on which the stop is formed. Secured to this keeper is a spring 13, which extends beyond the stop, as shown. Pivoted to bearings 14 on the floor 2 of the car is a brace 15 shaped as shown in Fig. 3 and having two side members 16 and a cross bar 17, which extends through the slots formed by the two plates 9 and 10 of the guides 8. The brace is made of round bar iron and is preferably turned at the lower end to form trunnions 19, which are adapted to bearings 14 on the floor of the car. When the seat is in the raised position, as shown in Figs. 1 and 3, the cross bar 17 of the brace is located under the stop 11 and the spring 13 tends to hold the bar in this position preventing the seat from being released and moved accidentally.

It will be noticed that the stop 11 is slightly inclined so that as the seat section is pulled the brace will slide upon the inclined portion of the stop against the pressure of the spring until it passes the stop when the seat can be lowered, the brace sliding in ways between the two plates 9 and 10 until the cross bar 17 comes in contact with the rear end of the keeper formed by the plate 10, which acts as a stop 18. When the brace is against this stop, the seat is in a horizontal position, or substantially a horizontal position, and can be used by a passenger, the brace supporting the outer end of the seat.

Figure 2:
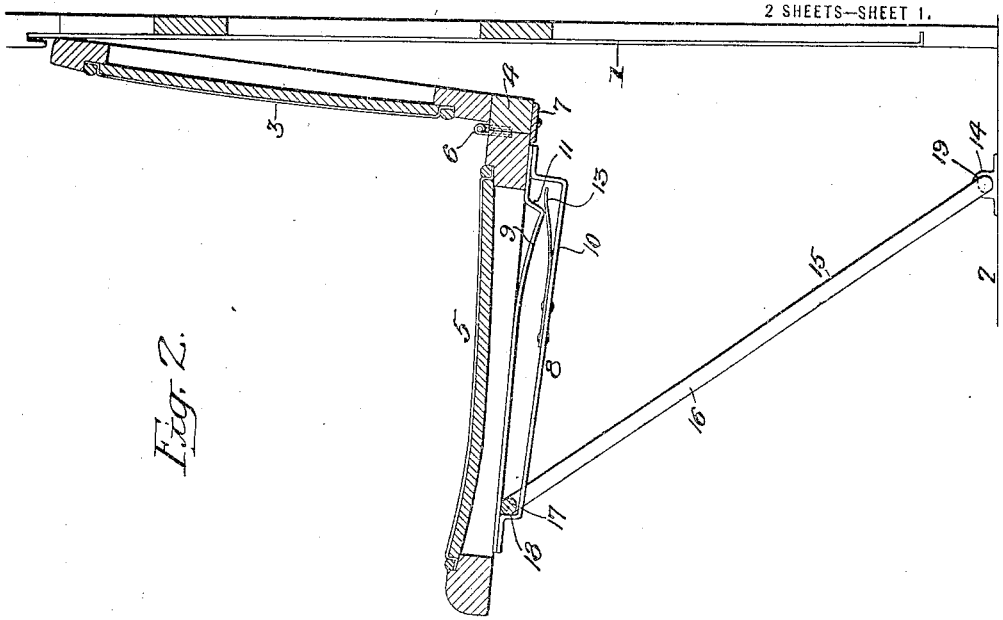
Fig. 2 is a view showing the seat section in a horizontal position.

The weight of the seat is sufficient to hold the brace in position. When it is desired to raise the seat, all that is necessary is to move the seat section from the position shown in Fig. 2 to that shown in Fig. 1, and the cross bar 17 will pass the spring and enter the space under the stop 11. The spring will hold the bar in this space and the bar will retain the seat in the upright position until it is again pulled down by pressure, which overcomes the spring.

Where the seat is of a width to accommodate two persons, I provide two guides 8—one at each end of the seat—and use a single brace extending from both guides. In a narrow seat, a single guide may be used. Where the seat is of considerable length, the guides and brace may be duplicated.

I claim:

1. The combination in a car seat, of a fixed back; a bottom rail; a seat section hinged to the bottom rail; a guide secured to the under side of the seat section, said guide being made of two plates, one plate having an inclined stop at the end nearest the hinge of the seat, the other being in the form of a keeper and extending over the first mentioned plate and having a stop at the end near the outer edge of the seat; a spring secured to the keeper at the first mentioned stop; and a brace pivoted to the floor and extending through the guide and arranged to engage either of the stops.

2. The combination in a car seat, of a back section; a bottom rail; a seat section hinged to the rail; two guides, one at each end of the seat, each guide having two stops, the stop nearest the hinges being beveled; two bearings on the floor of the car; a brace having two upright sections and a horizontal section, said horizontal section of the brace extending through the guides, the lower ends of the brace being turned at right angles and adapted to bearings, the brace being so proportioned that it will retain the seat in either of its two positions.

BERNARD SCHECHTER.